(12) United States Patent
Michaelson et al.

(10) Patent No.: US 8,001,418 B2
(45) Date of Patent: Aug. 16, 2011

(54) FAULT DETECTION AND CORRECTION FOR SINGLE AND MULTIPLE MEDIA PLAYERS CONNECTED TO ELECTRONIC DISPLAYS, AND RELATED DEVICES, METHODS AND SYSTEMS

(75) Inventors: Dennis Michaelson, London (CA); Joseph Hishon, London (CA)

(73) Assignee: EK3 Technologies, Inc., Ontario (CA)

( * ) Notice: Subject to any disclaimer, the term of this patent is extended or adjusted under 35 U.S.C. 154(b) by 244 days.

(21) Appl. No.: 12/382,027

(22) Filed: Mar. 6, 2009

(65) Prior Publication Data

US 2009/0228738 A1 Sep. 10, 2009

Related U.S. Application Data

(60) Provisional application No. 61/064,482, filed on Mar. 7, 2008.

(51) Int. Cl.
*G06F 11/00* (2006.01)
(52) U.S. Cl. ............... 714/13; 714/11; 714/4; 725/151
(58) Field of Classification Search ............ 714/4, 11, 714/13; 725/143, 151
See application file for complete search history.

(56) References Cited

U.S. PATENT DOCUMENTS

| 7,526,568 | B1 * | 4/2009 | Swanton et al. | 709/239 |
|---|---|---|---|---|
| 7,788,545 | B2 * | 8/2010 | Yanagi | 714/47 |
| 2006/0002418 | A1 | 1/2006 | Jennings | |
| 2007/0209005 | A1 | 9/2007 | Shaver et al. | |
| 2009/0228897 | A1 | 9/2009 | Murray et al. | |
| 2010/0115326 | A1 * | 5/2010 | Westeroth | 714/4 |

FOREIGN PATENT DOCUMENTS

WO WO-2009020640 A2 2/2009

\* cited by examiner

*Primary Examiner* — Marc Duncan
(74) *Attorney, Agent, or Firm* — Mintz, Levin, Cohn, Ferris, Glovsky and Popeo P.C.

(57) ABSTRACT

Systems, devices, software, hardware and networks adapted and arranged for monitoring and correcting faults in networked media player systems that include electronic displays are provided. After detection or notification of a fault in at least one networked media player in a network of at least two, or N, media players operationally connected to electronic displays, the invention provides an alternate source of signal to the affected display. In some preferred embodiments, the invention utilizes at least one additional, or N+1, media player as a backup to substitute for the failed media player. Reconfiguration of the faulted media player by means of the N+1 backup networked media player advantageously increases the reliability and efficiency of ongoing maintenance of digital visual systems operating in commercial and other environments.

36 Claims, 3 Drawing Sheets

Figure 1:
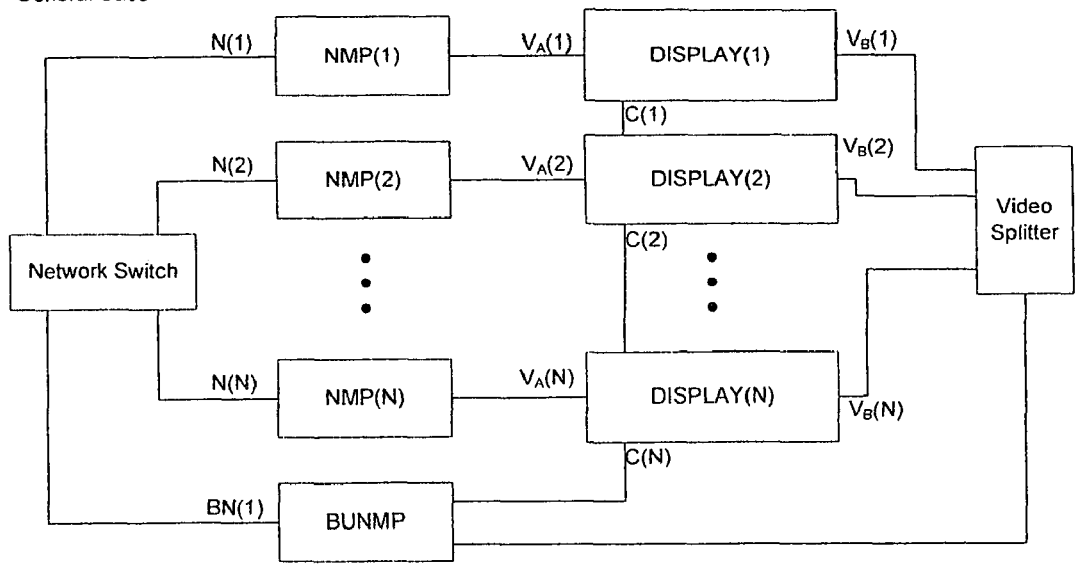

Fault detection and correction for single and multiple media players connected to electronic displays General Case Degenerate Case

FAULT DETECTION AND CORRECTION FOR SINGLE AND MULTIPLE MEDIA PLAYERS CONNECTED TO ELECTRONIC DISPLAYS, AND RELATED DEVICES, METHODS AND SYSTEMS

PRIORITY STATEMENT

Applicant hereby claims priority to U.S. Provisional Patent Application Ser. No. 61/064,482, filed Mar. 7, 2008, and entitled Fault Detection And Correction For Single And Multiple Media Players Connected To Electronic Displays, And Related Devices, Methods And Systems. All the materials and information comprising the disclosure provided in the above-identified Provisional Patent Application are hereby incorporated by reference.

FIELD OF THE INVENTION

The present invention relates to software, hardware, devices, systems and methods for providing immediate marketing and advertising information to target audiences in business environments and feedback to business establishments, and particularly to software, hardware, devices, systems and methods that are adapted and arranged to efficiently increase the reliability and ongoing maintenance of digital visual systems operating in such environments.

BACKGROUND OF THE INVENTION

Networked media players connected to electronic displays are being adopted in many business and commercial environments to communicate various messages to an audience within those environments. Examples of uses of such systems include restaurant and coffee house menu boards, airport scheduling displays, and security camera systems. A number of physical configurations can be implemented in these business environments. These configurations include, as examples, a single network media player connected to a single electronic display, a single network player connected to a plurality of displays, or a plurality of networked players each connected to a single or plurality of electronic displays. These various configurations allow a number of different business applications to be created including, but not limited to, digital (video) signage, digital (video) menu boards, video walls, in-store video advertising systems, airport informational displays, and the like. Virtually all commercial and business environments are amenable to the use of such systems.

Common problems exist with conventional systems of this type, however. With any electronic based system such as the conventional systems mentioned herein, it is typical that, from time-to-time that single points of failure occur with the equipment used. These single points of failure, or faults, will cause the messaging to stop being shown on the electronic display. Because such messaging is frequently in a commercial context where the lack of reliability of the display system can greatly undercut its intended purpose, these faults can be costly in terms of both diminishing the commercial success of the target business, and in upkeep and maintenance time and costs. There is therefore a need for methods and systems to increase the reliability, efficiency and ease of management of maintenance of such display systems.

SUMMARY OF THE INVENTION

Accordingly, it is an object of the present invention to remedy the drawbacks of such conventional systems by providing devices, methods, systems and networks adapted and arranged for minimizing or eliminating these failures or faults.

Another object of the present invention is to provide business methods and systems for providing reliable marketing and advertising that can be managed remotely and immediately to fulfill the commercial goals of the users of such systems and methods.

In accordance with these and other objects of the invention, a method is provided for correcting one or more faults in the electronic display functions of a digital system network, wherein the network comprises one or a plurality of electronic displays. In some preferred embodiments, the method comprises the steps of: A) providing N networked media players, wherein each of the N networked media players is operatively connected to at least one corresponding electronic display, and wherein each display has at least two alternately selectable inputs, B) providing an additional (N+1) networked media player, wherein the N+1 player is operatively connected to each of the N networked media players and to each of the electronic displays, and wherein the N+1 player comprises video display screen reconfiguration software and media playlist reconfiguration software, C) monitoring each of the NMP's to detect a fault with respect to a specific NMP, wherein the fault affects a specific display, and D) with respect to the specific display, switching the display input from the faulted NMP to an alternately selected input, wherein the alternately selected input is the N+1 NMP.

Advantageously, methods of the invention may include the further Step of E) reconfiguring the network to bypass the faulted NMP, and to substitute the N+1 NMP therefore, wherein the N+1 NMP is adapted and arranged to provide content and instructions to the specific display via the alternately selected input to the extent necessary to correct the detected fault. Methods of the invention may also include wherein Step C is performed by the N+1 NMP, and wherein Step D is performed by the N+1 NMP such that the content and instructions provided by the substituted N+1 NMP provides all of the functions formerly provided by the faulted NMP, including content.

As yet another advantage, the present methods may further include wherein Step D is performed by the N+1 NMP such that the content and instructions provided by the substituted N+1 NMP provide the functions formerly provided by the faulted NMP, including alternate content, substitute content, and content provided through a tertiary or other source via the N+1 NMP. Many permutations of the invention are provided in order to render the invention adaptable to numerous uses, circumstances and environments. Some of these advantageous variations include wherein one or more of Steps C and D are performed by an end user or a system operator, and wherein one or more of Steps C and D are performed by a server operatively connected to the digital system network. Moreover, most steps of the present methods, as well as most functions of the present methods and systems can be automated via one or more digitally enabled means.

As another positive aspect of some embodiments of the present methods, the server is adapted and arranged to do one or more of provide content and instructions such as playlists and schedules to one or more NMP's, monitor one or more of the NMP's and report their status to one or more operators; and provide one or more conduits by which the operators can run the commands on the N+1 NMP that enact the reconfiguration of one or more displays.

An additional positive aspect of the methods of the invention pertains to embodiments wherein one or more of Steps C, D and E are performed by a server operatively connected to the digital system network. Alternatively, the methods and systems of the invention are adaptable such that one or more of Steps C, D and E are performed by a system operator acting through the server.

Many aspects and characteristics of the methods, hardware, devices, systems and components of the invention utilize one or more software means or suites in order to effect, configure, reconfigure, and operate the many embodiments of the invention. In one advantageous aspect, software means are provided in one or more of the components of the network, the software means being adapted and arranged for performing one or more functions of the present methods and systems.

The present methods and systems are adaptable to many commercial environments. As examples, each visual display may comprise one or more selected from the group comprising video monitors, signage, flat panel LCD displays, video projectors, televisions, Plasma displays, electronic paper displays, flap leaf displays, OLED displays, FED displays, SED displays, and CRT's capable of receiving and displaying one or more of a video and an audio signal.

As another advantage of the invention, and consistent with the objects thereof, systems and networks comprising the invention are provided. In some preferred embodiments of the invention, a digital system network adapted and arranged for providing one or more of video and audio signals to one or a plurality of electronic displays is provided. A network or system of the invention is adapted and arranged for correcting one or more faults in the electronic display or displays of the system and other functions of the network, the system comprising: A) a network of N media players, wherein each of the N networked media players is operatively connected to at least one corresponding electronic display, and wherein each display has at least two alternately selectable inputs, B) an additional (N+1) networked media player, wherein the N+1 player is operatively connected to each of the N networked media players and to each of the electronic displays, and wherein the N+1 player comprises video display screen reconfiguration software and media playlist reconfiguration software, C) means for monitoring each of the NMP's to detect a fault with respect to a specific faulted NMP, wherein the fault affects a specific display, and D) means for switching the display input from the faulted NMP to an alternately selected input, wherein the alternately selected input is the N+1 NMP.

Systems and networks of the invention may further comprise E) means for reconfiguring the network to bypass the faulted NMP, and to substitute the N+1 NMP therefor, wherein the N+1 NMP is adapted and arranged to provide content and instructions to the specific display via the alternately selected input to the extent necessary to correct the detected fault. As an additional advantage, systems, networks and methods of the invention may include wherein the N+1 NMP is adapted and arranged to perform the functions of means C. Moreover, a system of the invention may include wherein the N+1 NMP is adapted and arranged such that the content and instructions provided by the substituted N+1 NMP provides all of the functions formerly provided by the faulted NMP, including content.

Systems, networks and methods of the invention may also comprise wherein the N+1 NMP is adapted and arranged such that the content and instructions provided by the substituted N+1 NMP provide the functions formerly provided by the faulted NMP, including alternate content, substitute content, and content provided through a tertiary or other source via the N+1 NMP.

As yet another advantage, the present invention includes wherein one or more of the functions of one or more of means C and means D are actuated by an end user or a system operator, as well as wherein one or more functions of one or more of means C and D are actuated by a server operatively connected to the digital system network. As another positive aspect, the server can be adapted and arranged to do one or more of provide content and instructions such as playlists and schedules to one or more NMP's, monitor one or more of the NMP's and report their status to one or more operators; and provide one or more conduits by which the operators can run the commands on the N+1 NMP that enact the reconfiguration of one or more displays.

As yet another similar advantage, the present invention alternatively includes wherein one or more of means C, D and E, are actuated by a server operatively connected to the digital system network, and wherein one or more of means C, D and E, are actuated by a system operator acting through the server. In accordance with the objects of the invention, software means are provided in one or more of the components of the network, and wherein the software means are adapted and arranged for performing one or more functions of the system.

Systems and methods of the invention are adaptable to many commercial environments. As examples, each visual display may comprise one or more selected from the group comprising video monitors, signage, flat panel LCD displays, video projectors, televisions, Plasma displays, electronic paper displays, flap leaf displays, OLED displays, FED displays, SED displays, and CRT's capable of receiving and displaying one or more of a video and an audio signal. BUS:

The present invention includes also novel methods for doing business in the relevant commercial environments. In one significant aspect, the invention includes a method for doing business in a commercial environment that utilizes one or a plurality of electronic displays to provide one or more of advertising and marketing information, the method adapted and arranged to correct one or more faults in the electronic display functions of a digital system network comprising those displays, the method comprising the steps of: A) providing N networked media players, wherein each of the N networked media players is operatively connected to at least one corresponding electronic display, and wherein each display has at least two alternately selectable inputs, B) providing an additional (N+1) networked media player, wherein the N+1 player is operatively connected to each of the N networked media players and to each of the electronic displays, and wherein the N+1 player comprises video display screen reconfiguration software and media playlist reconfiguration software, C) monitoring each of the NMP's to detect a fault with respect to a specific NMP, wherein the fault affects a specific display, and D) with respect to the specific display, switching the display input from the faulted NMP to an alternately selected input, wherein the alternately selected input is the N+1 NMP.

In yet another positive aspect, the present business methods may further include Step E), reconfiguring the network to bypass the faulted NMP, and to substitute the N+1 NMP therefor, wherein the N+1 NMP is adapted and arranged to provide content and instructions to the specific display via the alternately selected input to the extent necessary to correct the detected fault, as well as wherein Step C is performed by the N+1 NMP.

In a similar adaptation, the present business methods provide for wherein Step D is performed by the N+1 NMP such that the content and instructions provided by the substituted N+1 NMP provides all of the functions formerly provided by the faulted NMP, including content, as well as for wherein Step D is performed by the N+1 NMP such that the content and instructions provided by the substituted N+1 NMP provide the functions formerly provided by the faulted NMP, including alternate content, substitute content, and content provided through a tertiary or other source via the N+1 NMP.

DETAILED DESCRIPTION OF THE INVENTION

The present methods and systems of the invention are directed toward decreasing or effectively eliminating the effect of electronic display failures. In one key overall characteristic, the present systems, methods, devices, hardware and software have application in ensuring that failures in networked media players can be attenuated or immediately remedied by a single back-up networked media player (BUNMP). In the context of the invention, such a BUNMP is capable of duplicating and displaying the message of any other failed media player. This functionality ensures that the correct information is displayed to the target audience within the business environment during those events where one of the networked media players fails to function correctly. This functionality advantageously increases the reliability of the messaging being shown on the displays in the target business environment. Aspects of the invention also allow for time to physically replace or fix a malfunctioning, or under-functioning, networked media player. Before the present invention, there existed no system configured in such a way that would allow a single or plurality of displays to keep displaying correct information should a malfunction occur in a networked media player supplying the video source to a display.

In the context of the invention, certain salient aspects are significant. A first aspect is that the media players are connected to an electronic network that supports two-way digital communications, such as a TCP/IP (Transfer Control Protocol/Internet Protocol) network. As an advantage of the present invention, such a network does not necessarily have to be connected to a centralized server that contains data and the content files to be played.

A second salient aspect is that there can be provided on all networked media players software that supports communications between each networked media player. A third assumption is that N+1, networked media players (where N is the number of unique video signals connected to an electronic display or displays required to display video) are used in this configuration. The additional networked media player is referred to as the back-up network media player. A fourth aspect is that the configuration of the electronic displays is such that an alternate (or secondary) video source is adapted and operationally arranged to be supplied from a networked media player to the electronic display.

A fifth key aspect is that a secondary communications port (such as RS-232, USB or secondary network connection) is available for communication with the electronic display when the video input signal to that electronic display is in a status, such as a fault status, that should be switched to an alternate video source. As a sixth key aspect, there is provided on the back-up networked media player software that is capable of signaling when an electronic display should switch to its secondary video input. A seventh salient characteristic of some possible embodiments of the invention is that whereby a video splitter with a single input and N number of outputs is available. This is only required when N is greater than one (N>1).

Thus, some key aspects of the invention may be summarized as comprising up to 7 salient aspects or components as follows. 1. An electronic communications network established between each of the networked media players. Systems, methods, hardware and software of the invention can be adapted and arranged to work in the context of virtually any type of network. Examples of such network types include Ethernets, Arcnets, Token Rings and Wi-Fi, among others. 2. Software means on each networked media player that is adapted and arranged to support communications between each Networked Media Player, and the N+1 Networked Media Player. 3. A network according to the invention includes N+1 networked media players, where N is the number of unique video signals being sent to electronic displays. The additional networked media player (N+1) is referred to as the back-up networked media player (BUNMP). 4. Each electronic display is capable of receiving at least one secondary (alternate) video input from a second source. 5. A secondary communications port in each display adapted and arranged for communicating with, and providing instructions to, each electronic display as to when to switch to the secondary video input. As an example, in the context of the invention, a conventional RS-232 control port in a display can be adapted and arranged for receiving commands from the BUNMP when a fault has been detected and the back-up system has been triggered. 6. Software means on the back-up networked media player (BUNMP) adapted and arranged for communicating with the client NMP's such that, when the fault detection/correction aspects of the system are triggered, certain functions are initiated and carried out. For example, in one operational context of an embodiment of a system according to the invention, when a display fault is detected and reported to the BUNMP, the BUNMP instructs the electronic display to switch to its alternate input, thus preserving or correcting the display's intended functions in the business environment in which it is operating. Such software means can include also means for triggering and sending one or more fault reports to an operator. 7. In some embodiments of the invention, a video splitter can be provided between the BUNMP and the display screens to thereby provide the system with another configuration and capability useful for distributing a single source to N displays.

Figure 2:
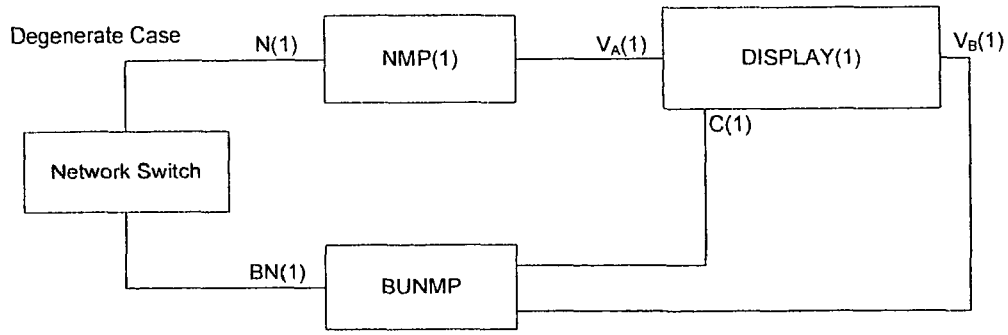
Figure 3:
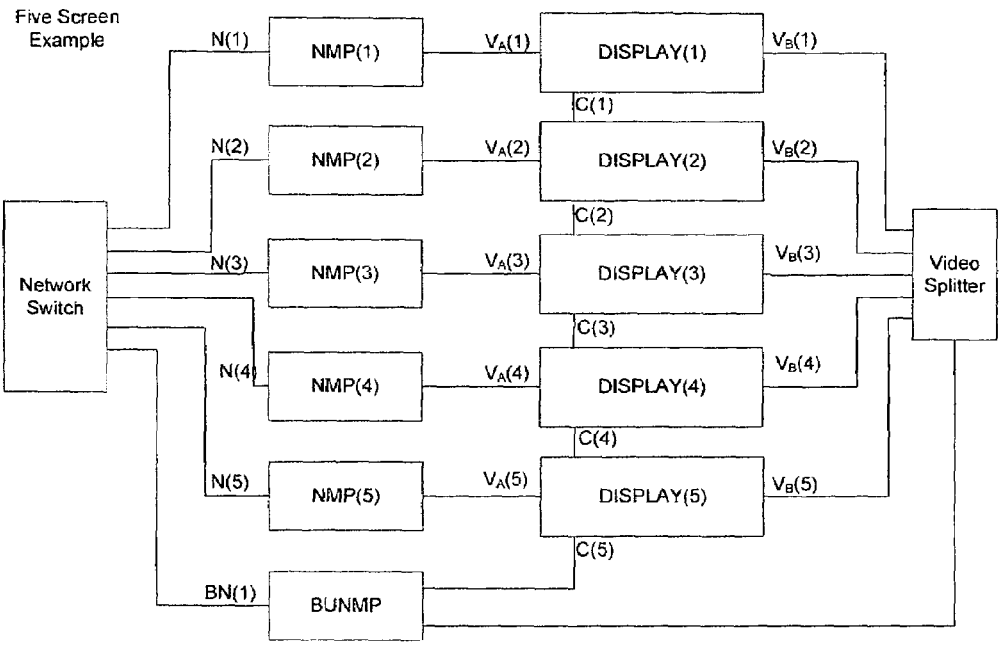

By combining some of the above salient aspects as described herein, a configuration of a single or plurality of electronic displays can be adapted and arranged to enable a single back-up network media player to monitor and replace the video output of any single failed networked media player. FIGS. 1-3 are illustrative of how these devices can to be configured to achieve the results desired by users and managers of such systems.

The duplication of networked media player content on the back-up network media player provides distinct advantages in media display systems. In accordance with some preferred embodiments of the invention, each network media player (NMP) is adapted and arranged to store a set of content files and instructions associated with those files. This content and the instructions are stored locally on a local hard drive or similar storage medium. The content and associated instruction set for each network media player are typically received from a remote server which is adapted and arranged to manage and direct specific content to specific NMP's. Thus, each networked media player receives content and associated instructions specific to its application and physical location. In accordance with advantageous aspects of the invention, the back-up media player (BUNMP) possesses a copy of each networked media player's specific content and associated instructions. In accordance with this aspect of the invention, the present systems, methods, hardware and software are adapted and arranged such that a number of methods and systems for achieving this are provided, as described herein.

In one key aspect, the server assisted duplication of media from a networked media player provides additional reliability. This method of achieving content and instruction duplication is to provide a remote server which is operationally enabled to not only 1) manage content and instructions to each networked media player but to also, 2) send duplicate content and associated instructions to the back-up networked media player. The back-up networked media player would store a copy of the content and instruction set on its local storage medium that it is responsible for backing up.

Another method of duplicating the content and instructions is to have the back-up networked media player (BUNMP) adapted and arranged to monitor the storage medium with respect to content and instruction sets on each networked media player (NMP) within a particular configuration. As another advantage of the invention, such autonomous monitoring and duplicating occurs independent of any direct communications from a remote server. Thus configured, the back-up networked media player would communicate periodically to each networked media player. The frequency of communication could be set depending upon factors specific to the commercial context in which that embodiment of the invention is intended to operate. In this context, when the back-up network media player detects that the content and associated instructions have changed on any of the networked media player's local storage media, the BUNMP would duplicate the content and associated instructions by copying the files over the network to its own local storage medium.

The detection and reporting of a fault is an important aspect of the present systems, methods, hardware and software. The perceived detection of a fault indicates that one of the networked media players may not be playing its content properly, or that it is not operating in its expected or intended state. The detection of this fault can be captured in a number of ways, for example, by a remote server or by the back-up network media player. In any case of a detected fault, a faulty state may be communicated, for example, from a networked media player through an error code (software error, hard drive read error, etc). If the remote server or the back-up networked media player receives an error code, a fault correction state will be activated. Another example of a trigger of fault detection is the lack of response from a particular networked media player over a defined period of time. Thus, one or more components of the invention, such as the BUNMP, may be configured to poll individual displays or NMP's at set intervals, for example, minutes or hours. Should no response be heard within the prescribed time period it is presumed that a fault has occurred (hardware malfunction, power disruption, etc). It should be noted that, in accordance with other advantageous aspects of the invention, a system can be configured such that a defined number of attempts or failures, may be observed before the fault correction state is entered. When this type of fault is detected, the fault correction state will be activated. Detection of a fault is described in greater detail below Under normal operating conditions in many embodiments of the present methods and systems, the remote server maintains contact with each of the networked media players. This contact is checked periodically, as examples, several times per hour to once per day. Should a remote server not have contact with a network media player within the time it expects this may mean that the network is not functioning correctly or that the network media player itself is not functioning properly. A criteria threshold may thus be defined that indicates how many checks must fail before a remote server assumes that the networked media player is not functioning correctly. When this criterion is met, and the remote server determines that the network media player is potentially in a faulty state, the remote server will initiate corrective action. This corrective action may include alerting the operator of the remote server that something is wrong or the server may initiate corrective action automatically. In some embodiments, when a faulty state is entered, the back-up networked media player will receive instructions that initiate the Fault Correction State for the specified networked media player (the presumed faulty player).

In accordance with other aspects of the invention, fault detection can be effected also by the back-up networked media player, which is frequently in communication with its assigned networked media players, that is, the networked media players in the local configuration of the specific embodiment. These communications may be used to check for content and instruction updates (as described herein with respect to the method for duplicating media on a networked media player) or it could be a scheduled "check-in" to see if one or more of the networked media players are still operating as expected or intended. Should a back-up networked media player not receive normally expected communications with a networked media player, the BUNMP assumes a fault has occurred. It may then initiate the fault correction state itself, or alert a remote server that a fault has occurred.

When it has been determined that a fault has occurred by either the remote server or the back-up networked media player the fault correction state is entered. In this state, the back-up networked media player is instructed to start playing the content, as per the associated instruction set for that content, for the faulty networked media player. As explained, in such configurations, the back-up network media player has all the content and instruction sets from all the networked media players from the duplication of the appropriate content files and associated instructions from all the network media players local storage medium to its own local storage media. The back-up media player also sends a signal via the secondary communications port to the electronic display connected to the faulty media player. This signal changes the source input of the electronic display from the faulty networked media player to the back-up networked media player (from the video splitter in a multi networked media player configuration). This now means that the input video signal to the electronic display is now the back-up networked media player's video signal. Once the input signal has changed the electronic display is showing the content being played by the networked media player that it was originally connected to. The configuration of the displays, networked media players and back-up network media player is now in the fault correction state.

DESCRIPTIONS OF THE FIGURES

FIG. 1 illustrates an example of an N display configuration. Normally Networked Media Players NMP(1 . . . N) drive the DISPLAYS(1 . . . N) via the primary video inputs VA(1 . . . N). The NMP's are capable of communicating with one other, the BUNMP, or with a server (not shown) via the network switch. The backup BUNMP drives the secondary video inputs VB(1 . . . N) with the same video signal via a Video Splitter. The BUNMP is also connected to the serial control inputs of the displays in a daisy chain fashion via C(N), and through this connection it can command any of the displays to select the secondary video input in place of the primary video input.

FIG. 2 illustrates an example of a single display configuration. This shows the simplest configuration where one NMP (1) normally drives the primary video input VA(1) of DISPLAY(1). The backup BUNMP drives the secondary video input VB(1) of DISPLAY(1). The backup BUNMP is also connected to the serial control input C(1) of the display, which enables it to command the display to show either the primary or the secondary video input. NMP(1) and the BUNMP can communicate via the network switch, which enables the BUNMP to determine if NMP(1) is functioning FIG. 3 illustrates an Example of a 5-display configuration working under normal operating conditions. NMP(1 . . . 5) drive the displays (1 . . . 5) via the primary video inputs VA(1 . . . 5). The network switch enables either the BUNMP or a server (not shown) to monitor NMP(1 . . . 5) for faults. The BUNMP, Video Splitter, the secondary video inputs VB(1 . . . 5), and the display control inputs C(1 . . . 5) provide the redundancy and reconfiguration capacity necessary to support fault tolerance.

Figure 4:
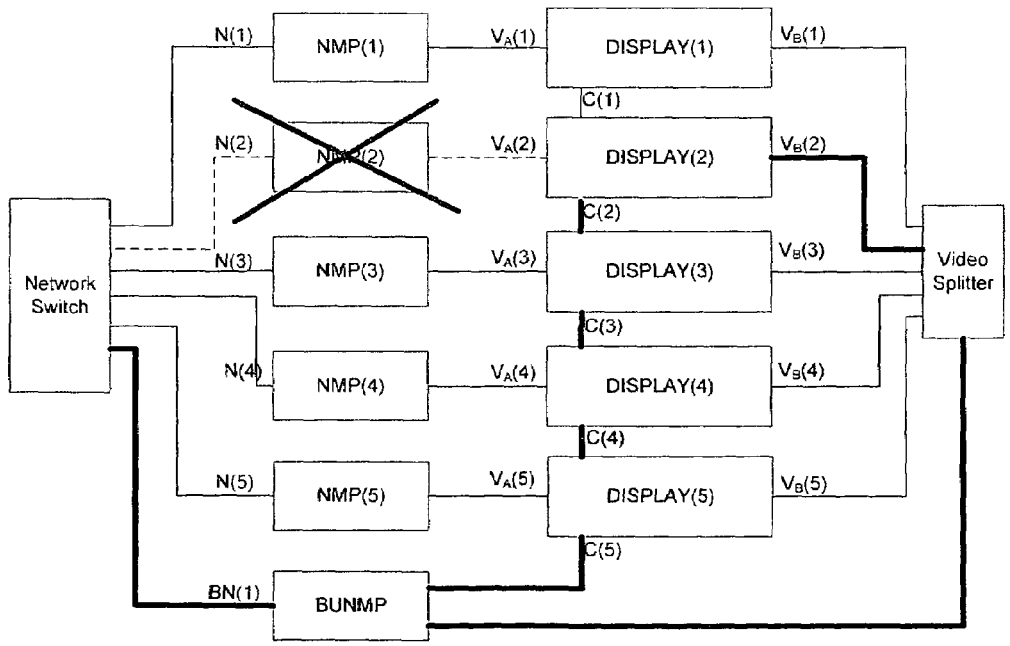

FIG. 4 illustrates an Example of a 5-display configuration working in fault correction mode for Networked Media Player 2. NMP(2) has faulted and is no longer driving DISPLAY(2) with the correct video signal. The fault has been detected and identified by either the BUNMP or the server. The BUNMP has been reconfigured to play back the same video signal that NMP(2) did prior to the fault. The BUNMP has also sent a command via C(5 . . . 2) in a daisy-chain fashion to instruct DISPLAY(2) to switch to showing the secondary input VB(2). The system is now running in a fault correction mode, and there is no visible sign of the fault to the viewers of the displays.

Figure 5:
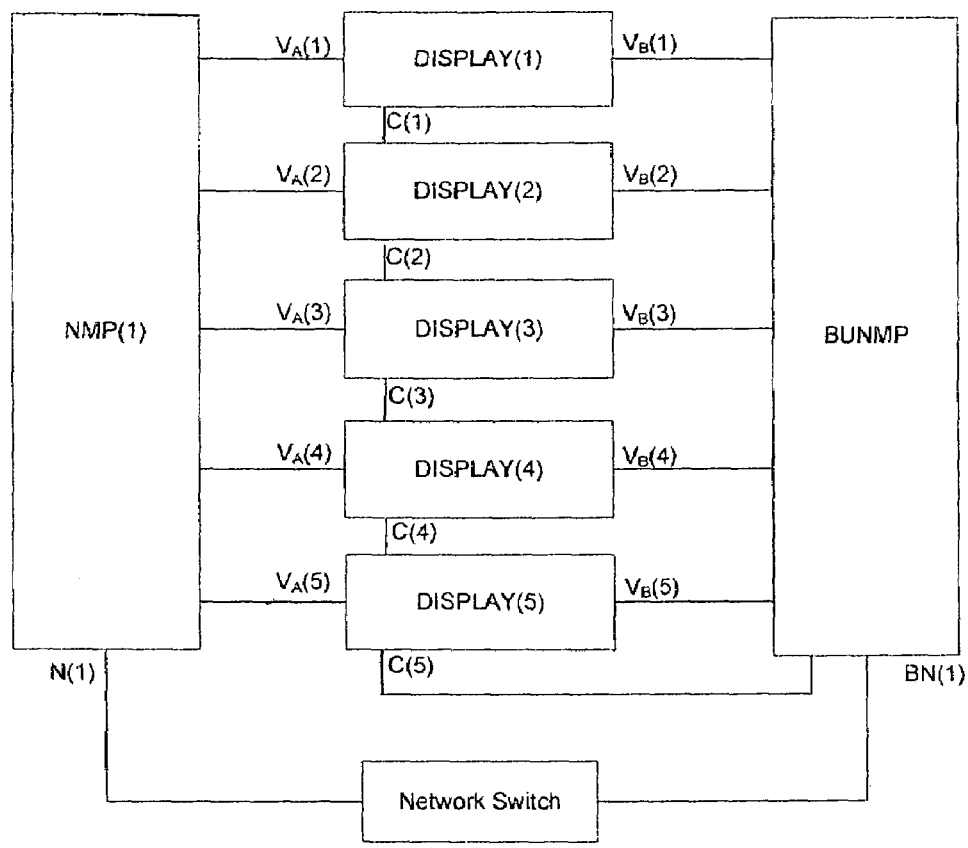

With respect to FIG. 4, the 6th networked media player (BUNMP) is configured to periodically check the status of each of the 5 networked media players. It also periodically duplicates the content and associated instruction sets from each of the 5 networked media players to its local storage medium. During one of its routine status checks the back-up networked media player does not receive expected communications from networked media player #2. The back-up networked media player recognizes this as a Fault. The back-up network then enters the fault correction state and starts playing the content files it last received from the duplication process. A signal is then sent to electronic display #2 via the back-up networked media players' secondary communications port. This signal switches the electronic display's source input from the network media player to the back-up network media player. Thus, Electronic Display #2 is then playing the duplicated content from networked media player #2 to back-up networked media player. The configuration is now in the fault correction state FIG. 5 illustrates an Example of a 5-display configuration utilizing multi-output Network Media Players. Where an NMP with more than one video output is used (for example a PC with multiple video cards) the system can be reduced to two multi-output NMPs—the primary NMP(1) and the backup BUNMP which plays a mirror of the content played by the primary NMP(1). Normally the multi-output NMP(1) drives all 5 of DISPLAYS(1 . . . 5) via the primary video inputs VA(1 . . . 5). If either a server or the BUNMP detect a fault in NMP(1) then the BUNMP can command DISPLAYS(1 . . . 5) to switch to showing the video signal from input VB(1 . . . 5) from the BUNMP.

The invention claimed is:

1. A method for correcting one or more faults in the electronic display functions of a digital system network, the network comprising one or a plurality of electronic displays, the method comprising the steps of:
    A) providing N networked media players, wherein each of the N networked media players is operatively connected to at least one corresponding electronic display, and wherein each display has at least two alternately selectable inputs,
    B) providing an additional (N+1) networked media player, wherein the N+1 player is operatively connected to each of the N networked media players and to each of the electronic displays,
        and wherein the N+1 player comprises video display screen reconfiguration software and media playlist reconfiguration software,
    C) monitoring each of the NMP's to detect a fault with respect to a specific NMP, wherein the fault affects a specific display, and
    D) with respect to the specific display, switching the display input from the faulted NMP to an alternately selected input, wherein the alternately selected input is the N+1 NMP.

2. The method of claim 1, further comprising the Step of
    E) reconfiguring the network to bypass the faulted NMP, and to substitute the N+1 NMP therefor, wherein the N+1 NMP is adapted and arranged to provide content and instructions to the specific display via the alternately selected input to the extent necessary to correct the detected fault.

3. The method of claim 2, wherein one or more of Steps C, D and E are performed by a server operatively connected to the digital system network.

4. The method of claim 2, wherein one or more of Steps C, D and E are performed by a system operator acting through the server.

5. The method of claim 1, wherein Step C is performed by the N+1 NMP.

6. The method of claim 1, wherein Step D is performed by the N+1 NMP such that the content and instructions provided by the substituted N+1 NMP provides all of the functions formerly provided by the faulted NMP, including content.

7. The method of claim 1, wherein Step D is performed by the N+1 NMP such that the content and instructions provided by the substituted N+1 NMP provide the functions formerly provided by the faulted NMP, including alternate content, substitute content, and content provided through a tertiary or other source via the N+1 NMP.

8. The method of claim 1, wherein one or more of Steps C and D are performed by an end user or a system operator.

9. The method of claim 1, wherein one or more of Steps C and D are performed by a server operatively connected to the digital system network.

10. The method of claim 9, wherein the server is adapted and arranged to do one or more of provide content and instructions such as playlists and schedules to one or more NMP's, monitor one or more of the NMP's and report their status to one or more operators; and provide one or more conduits by which the operators can run the commands on the N+1 NMP that enact the reconfiguration of one or more displays.

11. The method of claim 1, wherein software means are provided in one or more of the components of the network, and wherein the software means are adapted and arranged for performing one or more functions of the method.

12. The method of claim 1, wherein each visual display comprises one or more selected from the group comprising video monitors, signage, flat panel LCD displays, video projectors, televisions, Plasma displays, electronic paper displays, flap leaf displays, OLED displays, FED displays, SED displays, and CRT's capable of receiving and displaying one or more of a video and an audio signal.

13. A digital system network adapted and arranged for providing one or more of video and audio signals to one or a plurality of electronic displays, the network being adapted and arranged for correcting one or more faults in the electronic display and other functions of the network, the system comprising:
  A) a network of N media players, wherein each of the N networked media players is operatively connected to at least one corresponding electronic display, and wherein each display has at least two alternately selectable inputs,
  B) an additional (N+1) networked media player, wherein the N+1 player is operatively connected to each of the N networked media players and to each of the electronic displays,
     and wherein the N+1 player comprises video display screen reconfiguration software and media playlist reconfiguration software,
  C) means for monitoring each of the NMP's to detect a fault with respect to a specific faulted NMP, wherein the fault affects a specific display, and
  D) means for switching the display input from the faulted NMP to an alternately selected input, wherein the alternately selected input is the N+1 NMP.

14. The system of claim 13, further comprising E) means for reconfiguring the network to bypass the faulted NMP, and to substitute the N+1 NMP therefor, wherein the N+1 NMP is adapted and arranged to provide content and instructions to the specific display via the alternately selected input to the extent necessary to correct the detected fault.

15. The system of claim 14, wherein one or more of means C, D and E, are actuated by a server operatively connected to the digital system network.

16. The system of claim 14, wherein one or more of means C, D and E, are actuated by a system operator acting through the server.

17. The system of claim 13, wherein the N+1 NMP is adapted and arranged to perform the functions of means C.

18. The system of claim 13, wherein the N+1 NMP is adapted and arranged such that the content and instructions provided by the substituted N+1 NMP provides all of the functions formerly provided by the faulted NMP, including content.

19. The system of claim 13, wherein the N+1 NMP is adapted and arranged such that the content and instructions provided by the substituted N+1 NMP provide the functions formerly provided by the faulted NMP, including alternate content, substitute content, and content provided through a tertiary or other source via the N+1 NMP.

20. The system of claim 13, wherein one or more of the functions of one or more of means C and means D are actuated by an end user or a system operator.

21. The system of claim 13, wherein one or more functions of one or more of means C and D are actuated by a server operatively connected to the digital system network.

22. The system of claim 21, wherein the server is adapted and arranged to do one or more of provide content and instructions such as playlists and schedules to one or more NMP's, monitor one or more of the NMP's and report their status to one or more operators; and provide one or more conduits by which the operators can run the commands on the N+1 NMP that enact the reconfiguration of one or more displays.

23. The system of claim 13, wherein software means are provided in one or more of the components of the network, and wherein the software means are adapted and arranged for performing one or more functions of the system.

24. The system of claim 13, wherein each visual display comprises one or more selected from the group comprising video monitors, signage, flat panel LCD displays, video projectors, televisions, Plasma displays, electronic paper displays, flap leaf displays, OLED displays, FED displays, SED displays, and CRT's capable of receiving and displaying one or more of a video and an audio signal.

25. A method for doing business in a commercial environment that utilizes one or a plurality of electronic displays to provide one or more of advertising and marketing information, the method adapted and arranged to correct one or more faults in the electronic display functions of a digital system network comprising those displays, the method comprising the steps of:
  A) providing N networked media players, wherein each of the N networked media players is operatively connected to at least one corresponding electronic display, and wherein each display has at least two alternately selectable inputs,
  B) providing an additional (N+1) networked media player, wherein the N+1 player is operatively connected to each of the N networked media players and to each of the electronic displays,
     and wherein the N+1 player comprises video display screen reconfiguration software and media playlist reconfiguration software,
  C) monitoring each of the NMP's to detect a fault with respect to a specific NMP, wherein the fault affects a specific display, and
  D) with respect to the specific display, switching the display input from the faulted NMP to an alternately selected input, wherein the alternately selected input is the N+1 NMP.

26. The method of claim 25, further comprising the Step of
  E) reconfiguring the network to bypass the faulted NMP, and to substitute the N+1 NMP therefore, wherein the N+1 NMP is adapted and arranged to provide content and instructions to the specific display via the alternately selected input to the extent necessary to correct the detected fault.

27. The method of claim 26, wherein one or more of Steps C, D and E are performed by a server operatively connected to the digital system network.

28. The method of claim 26, wherein one or more of Steps C, D and E are performed by a system operator acting through the server.

29. The method of claim 25, wherein Step C is performed by the N+1 NMP.

30. The method of claim 25, wherein Step D is performed by the N+1 NMP such that the content and instructions provided by the substituted N+1 NMP provides all of the functions formerly provided by the faulted NMP, including content.

31. The method of claim 25, wherein Step D is performed by the N+1 NMP such that the content and instructions provided by the substituted N+1 NMP provide the functions formerly provided by the faulted NMP, including alternate content, substitute content, and content provided through a tertiary or other source via the N+1 NMP.

32. The method of claim 25, wherein one or more of Steps C and D are performed by an end user or a system operator.

33. The method of claim 25, wherein one or more of Steps C and D are performed by a server operatively connected to the digital system network.

34. The method of claim 33, wherein the server is adapted and arranged to do one or more of provide content and instructions such as playlists and schedules to one or more NMP's, monitor one or more of the NMP's and report their status to one or more operators; and provide one or more conduits by which the operators can run the commands on the N+1 NMP that enact the reconfiguration of one or more displays.

35. The method of claim 25, wherein software means are provided in one or more of the components of the network, and wherein the software means are adapted and arranged for performing one or more functions of the method.

36. The method of claim 25, wherein each visual display comprises one or more selected from the group comprising video monitors, signage, flat panel LCD displays, video projectors, televisions, Plasma displays, electronic paper displays, flap leaf displays, OLED displays, FED displays, SED displays, and CRT's capable of receiving and displaying one or more of a video and an audio signal.

* * * * *